(12) United States Patent
Caliao et al.

(10) Patent No.: US 10,778,010 B2
(45) Date of Patent: Sep. 15, 2020

(54) RELATING TO REACTIVE POWER CONTROL IN WIND POWER PLANTS

(71) Applicant: VESTAS WIND SYSTEMS A/S, Aarhus N (DK)

(72) Inventors: Nolan Dadang Caliao, Singapore (SG); Manoj Gupta, Singapore (SG); Mario Dante Jardiel, Singapore (SG); Janakiraman Sivasankaran, Singapore (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/341,490

(22) PCT Filed: Sep. 27, 2017

(86) PCT No.: PCT/DK2017/050313
§ 371 (c)(1),
(2) Date: Apr. 12, 2019

(87) PCT Pub. No.: WO2018/068799
PCT Pub. Date: Apr. 19, 2018

(65) Prior Publication Data
US 2019/0305556 A1    Oct. 3, 2019

(30) Foreign Application Priority Data
Oct. 12, 2016 (DK) .................................. 2016 70800

(51) Int. Cl.
*H02J 3/18* (2006.01)
*F03D 9/25* (2016.01)
(Continued)

(52) U.S. Cl.
CPC ............. *H02J 3/18* (2013.01); *F03D 7/042* (2013.01); *F03D 9/25* (2016.05); *H02J 3/386* (2013.01); *Y02E 10/763* (2013.01); *Y02E 40/30* (2013.01)

(58) Field of Classification Search
CPC .......... H02J 3/18; F03D 7/042; Y02E 10/763; Y02E 40/30
(Continued)

(56) References Cited

U.S. PATENT DOCUMENTS

| | | | |
|---|---|---|---|
| 5,621,626 A * | 4/1997 | Bjorklund | H02J 3/36 363/35 |
| 6,859,374 B2 * | 2/2005 | Pollanen | H02M 7/5387 363/69 |

(Continued)

FOREIGN PATENT DOCUMENTS

| | | |
|---|---|---|
| EP | 1841037 A2 | 10/2007 |
| EP | 1919076 A2 | 5/2008 |

(Continued)

OTHER PUBLICATIONS

European Patent Examination Report for Application No. 17 778 181.2-1202 dated Jan. 31, 2020.
(Continued)

*Primary Examiner* — Pedro J Cuevas
(74) *Attorney, Agent, or Firm* — Patterson + Sheridan, LLP

(57) ABSTRACT

A method for controlling a renewable energy power plant comprising a plurality of wind turbine generators, the method comprising: measuring a voltage level associated with a point of interconnection between a power transmission network and the power plant; calculating a reactive power exchange limit based upon the measured voltage (Continued)

level; and controlling the power plant so that the calculated reactive power exchange limit is not exceeded.

19 Claims, 5 Drawing Sheets

(51) Int. Cl.
*F03D 7/04* (2006.01)
*H02J 3/38* (2006.01)

(58) Field of Classification Search
USPC .................................................. 290/44, 55
See application file for complete search history.

(56) References Cited

U.S. PATENT DOCUMENTS

| | | | | |
|---|---|---|---|---|
| 7,245,037 | B2* | 7/2007 | Angquist | H02J 3/1835 |
| | | | | 290/44 |
| 8,861,231 | B2* | 10/2014 | Cross | H02J 3/36 |
| | | | | 363/35 |
| 8,972,068 | B2* | 3/2015 | Beck | H02J 3/16 |
| | | | | 700/286 |
| 8,981,592 | B2* | 3/2015 | Zhang | H02J 3/16 |
| | | | | 307/17 |
| 9,013,902 | B2* | 4/2015 | Abe | H02J 3/00 |
| | | | | 307/31 |
| 9,553,454 | B2* | 1/2017 | Beck | H02J 3/16 |
| 9,685,887 | B2* | 6/2017 | Martin | H02M 7/493 |
| 9,856,857 | B2* | 1/2018 | Vitale | F03D 7/0276 |
| 10,116,135 | B1* | 10/2018 | Shapiro | H02J 3/12 |
| 10,128,657 | B2* | 11/2018 | Huang | H02J 3/36 |
| 10,148,122 | B2* | 12/2018 | Reddy | G06F 1/30 |
| 10,177,573 | B2* | 1/2019 | Shapiro | H02J 3/16 |
| 10,224,717 | B2* | 3/2019 | Murphy | H02J 3/381 |
| 10,424,935 | B2* | 9/2019 | Varma | H02M 7/44 |
| 2004/0032755 | A1* | 2/2004 | Pollanen | H02M 7/493 |
| | | | | 363/71 |
| 2006/0214643 | A1* | 9/2006 | Angquist | H02J 3/1835 |
| | | | | 322/17 |
| 2010/0237834 | A1 | 9/2010 | Alonso Sadaba et al. | |
| 2010/0314874 | A1* | 12/2010 | Bluhm | G05B 19/0421 |
| | | | | 290/44 |
| 2011/0031762 | A1 | 2/2011 | Letas | |
| 2012/0086412 | A1* | 4/2012 | Chimento | H02J 3/1842 |
| | | | | 323/207 |
| 2012/0173035 | A1* | 7/2012 | Abe | H02J 3/00 |
| | | | | 700/297 |
| 2013/0076037 | A1 | 3/2013 | Garcia | |
| 2013/0182467 | A1* | 7/2013 | Cross | H02J 3/36 |
| | | | | 363/35 |
| 2013/0218494 | A1* | 8/2013 | Chiang | G01R 21/006 |
| | | | | 702/61 |
| 2015/0349688 | A1 | 12/2015 | Wagoner et al. | |
| 2016/0076518 | A1* | 3/2016 | Vitale | F03D 7/046 |
| | | | | 290/44 |
| 2016/0254668 | A1* | 9/2016 | Huang | H02J 3/386 |
| | | | | 307/64 |
| 2017/0085086 | A1* | 3/2017 | Shapiro | H02J 3/18 |
| 2017/0250540 | A1* | 8/2017 | Varma | H02J 3/24 |
| 2018/0212429 | A1* | 7/2018 | Mende | H02J 3/18 |
| 2018/0233912 | A1* | 8/2018 | Spahic | H02M 7/797 |
| 2018/0233915 | A1* | 8/2018 | Spahic | H02J 3/18 |
| 2018/0269681 | A1* | 9/2018 | Vaiman | G05B 15/02 |
| 2019/0237971 | A1* | 8/2019 | Inam | H02J 3/1807 |
| 2019/0245349 | A1* | 8/2019 | Madani | H02J 3/12 |
| 2019/0288563 | A1* | 9/2019 | Yates | H02M 7/06 |
| 2020/0076193 | A1* | 3/2020 | Biris | H02J 3/1842 |

FOREIGN PATENT DOCUMENTS

| | | |
|---|---|---|
| WO | 2012062323 A2 | 5/2012 |
| WO | 2015086022 A1 | 6/2015 |
| WO | 2018068799 A1 | 4/2018 |

OTHER PUBLICATIONS

Danish Patent and Trademark Office for Application No. PA 2016 70800 dated Mar. 2017.
PCT Notification of Transmittal of the International Search Report and the Written Opinion of the International Searching Authority, or the Declaration for Application No. PCT/DK2017/050313 dated Apr. 1, 2018.

* cited by examiner

RELATING TO REACTIVE POWER CONTROL IN WIND POWER PLANTS

TECHNICAL FIELD

The present invention relates to a method of controlling a power plant, a power plant controller, and to a wind turbine power plant and to renewable energy power plants more generally.

BACKGROUND

It is now expected that newly commissioned wind power plants and other forms of renewable energy are able to regulate the power that they provide to a grid. A wind power plant comprises a plurality of wind turbine generators and is also known as a wind park or a wind farm. The regulation and general operation of the power plant is controlled by a power plant control system or controller (PPC), which implements operational limits and requirements as set out by a Transmission System Operator (TSO) or in country-specific grid interconnection requirements or 'grid codes'. The TSO also communicates power delivery demands to the PPC.

Grid codes commonly include specific restrictions on reactive power exchange at a Point of Interconnection (PoI) between the grid and the power plant. These restrictions are governed by so-called P-Q charts, which outline the grid code requirements for reactive power exchange limits based on real power output. The PPC implements power delivery demands received from the TSO, whilst ensuring that the limits and requirements set out in the P-Q charts are upheld.

However, limiting reactive power exchange based only upon active power measurements can result in disconnection of individual generators within the power plant, disconnection of the power plant as a whole, or even grid instability.

It is an aim of the present invention to address disadvantages associated with the prior art.

SUMMARY OF THE INVENTION

According to an aspect of the invention, there is provided a method for controlling a renewable energy power plant comprising a plurality of wind turbine generators, the method comprising: measuring a voltage level associated with a point of interconnection between a power transmission network and the power plant; calculating a reactive power exchange limit based upon the measured voltage level; and controlling the power plant so that the calculated reactive power exchange limit is not exceeded.

By calculating reactive power limits that are based upon a measured voltage, the system beneficially maintains safe operation of both the power transmission network and the generators. The safe operation is assured during periods of high and low voltage levels of the transmission network as well as during periods of reactive power control by the power plant. Any changes in circumstances of the transmission network can be accommodated by controlling the power plant according to the prescribed limits.

The power transmission network may be a local, national or international grid network such as the National Grid of Great Britain, and a further advantage lies in that by specifying reactive power limits based upon voltage levels, interconnection requirements of the grid are more likely to be met.

The ease of implementation of the system is particularly beneficial as it is able to be implemented within conventional power plants without additional instrumentation or adaptation.

Optionally, calculating the reactive power exchange limit may comprise determining a characteristic voltage level associated with the power transmission network.

Calculating the reactive power exchange limit may comprise determining whether the measured voltage level is above or below the characteristic voltage level.

The characteristic voltage level may be a nominal voltage level of the power transmission network. Using the nominal voltage level to calculate the reactive power exchange limit ensures that strict adherence to the grid code requirements will be met.

The characteristic voltage level may be a natural voltage level of the power transmission network. The natural voltage level of the power transmission network is to be understood as the voltage level which the power transmission network would normally have, in other words when it is operated under normal operating conditions and where minor deviations are neglected. Using a natural voltage level to calculate the reactive power exchange limit is advantageous in situations where the voltage at the point of intersection is known to be higher than the nominal voltage level, as using the natural voltage as basis for the limits creates a more practical implementation of the requirements of the grid code.

In an embodiment, the method comprises receiving a reactive power reference value from a transmission system operator associated with the power transmission network.

Calculating the reactive power exchange limit may comprise determining if the reactive power reference value corresponds to a reactive power supply or reactive power absorption demand.

If the reactive power reference value corresponds to a reactive power absorption demand and the measured voltage level is above the characteristic voltage level, the reactive power exchange limit level may be calculated as a maximum reactive power absorption level.

If the reactive power reference value corresponds to a reactive power absorption demand and the measured voltage level is below the characteristic voltage level, the reactive power exchange limit level may be calculated as a reactive power absorption level that is negatively proportional to the measured voltage level. Implementing this limit advantageously ensures grid stability by ensuring that the reactive power absorption at low measured voltage levels is kept within the safe limits.

If the reactive power reference value corresponds to a reactive power supply demand and the measured voltage level is below the characteristic voltage level, the reactive power exchange limit level may be calculated as the maximum reactive power supply level.

If the reactive power reference value corresponds to a reactive power supply demand and the measured voltage level is above the characteristic voltage level, the reactive power exchange limit level may be calculated as a reactive power absorption level that is negatively proportional to the measured voltage level. Implementing this limit advantageously ensures grid stability by ensuring that the reactive power supply at high measured voltage levels is kept within the safe limits.

The power plant may comprise reactive power compensation equipment. Compensation equipment ensures that a quick reaction to changes in reactive power demand can be achieved.

The method may comprise altering the operation of the power plant to meet the reactive power reference value demand if the reactive power reference value does not exceed the reactive power exchange limit level.

The method may comprise altering the operation of the power plant to supply or absorb the reactive power exchange limit level if the reactive power reference value exceeds the reactive power exchange limit level.

According to another aspect of the present invention, there is provided a power plant controller for a power plant having a plurality of wind turbine generators and reactive power compensation equipment, wherein the controller comprises a processor, a memory module, and an input/output system, and wherein the memory includes a set of program code instructions which when executed by the processor, implement a method as described above.

According to another aspect of the present invention, there is provided a computer program product downloadable from a communication network and/or stored on a machine readable medium, comprising program code instructions for implementing a method as described above.

BRIEF DESCRIPTION OF THE DRAWINGS

One or more embodiments of the invention will now be described, by way of example only, with reference to the accompanying drawings, in which.

DETAILED DESCRIPTION

Figure 1:
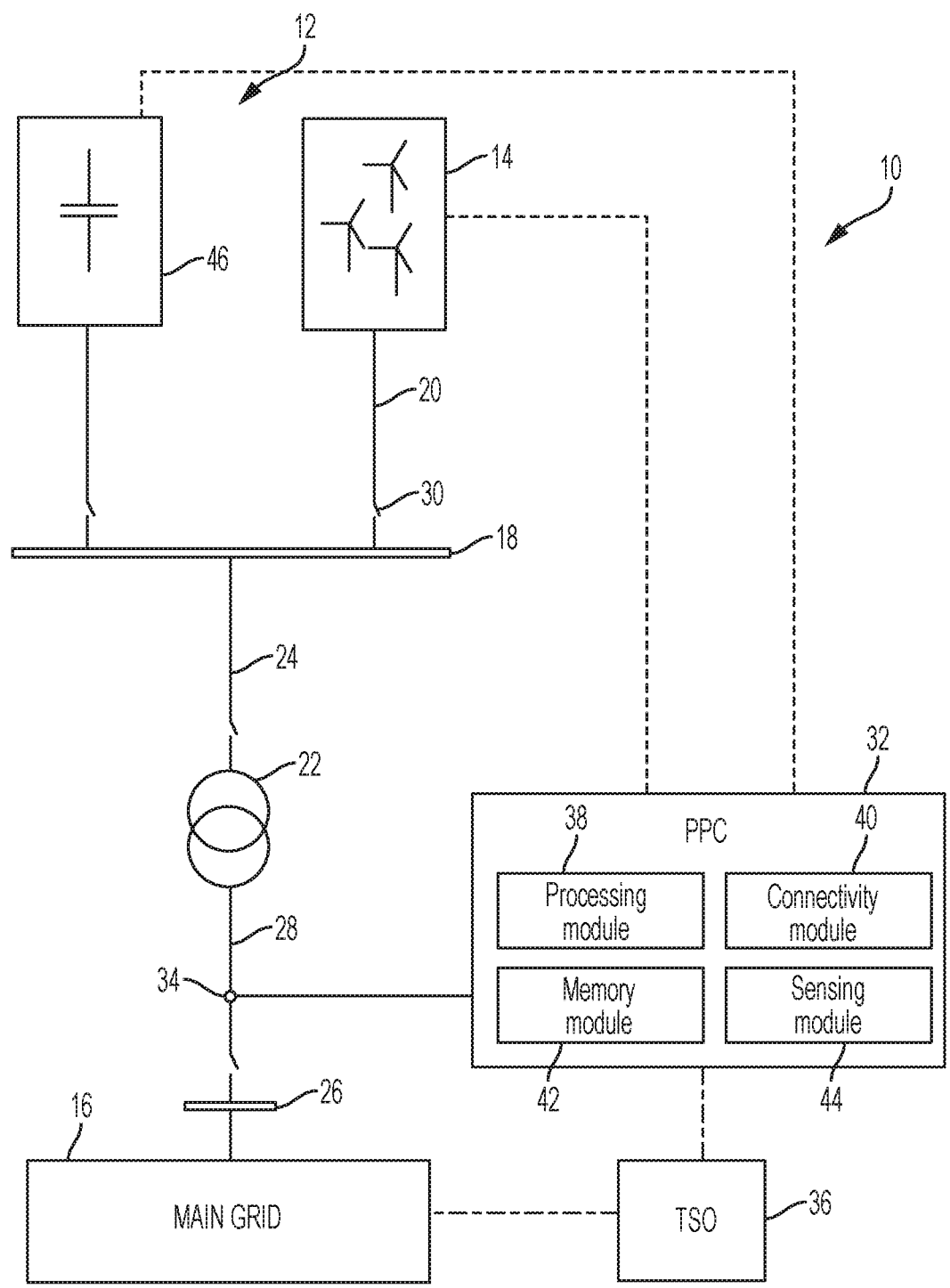
FIG. 1 is a schematic view of a power network including a wind power plant and a main grid according to an embodiment of the invention.

FIG. 1 illustrates a typical architecture in which a wind power plant (WPP) is connected to a main transmission grid as part of a wider power network. The example shown is representative only and the skilled reader will appreciate other specific architectures are possible, in relation to both wind power plants and power plants for other renewable energy sources. In addition, the skilled reader will appreciate that methods, systems and techniques also described below may be applicable to many different configurations of power network. Moreover, the components of the wind power plant and power network are conventional and as such would be familiar to the skilled reader.

FIG. 1 shows a power network 10 incorporating a wind power plant (WPP) 12 including a plurality of wind turbine generators 14 or more simply 'wind turbines'. A single wind turbine would also be possible. Each of the plurality of wind turbines 14 converts wind energy into electrical energy, which is transferred from the turbines 14 to a main transmission grid 16, for distribution. Each of the wind turbines 14 of the WPP 12 is connected to a local grid (not shown).

The WPP 12 is suitably connected to a collector bus 18 via a feeder line 20. The collector bus 18 may be at an intermediate voltage level that is suitable for relatively short distance power transmission, for example in the region of 10 to 150 kV, most usually between 110 and 150 kV. The collector bus 18 may also provide a point of common coupling (PCC) for a plurality of wind power plants, although only a single WPP 12 is shown here for simplicity.

The collector bus 18 is connected to a main step-up transformer 22 by a transmission line 24. The main transformer 22 is in turn connected to the main grid 16 at a Point of Interconnection (PoI) 26 by another transmission line 28. The PoI 26 is an interface between the WPP 12 and the main grid 16.

While the collector bus 18 may be required to span distances up to around 100 km, the main grid 16 may be an international, national, or regional grid such as the National Grid of Great Britain, for example, and therefore may be required to span distances of up to around 250 km or more. Accordingly, the voltage level of the main grid 16 may be much higher than the voltage level of the collector bus 18 for better transmission efficiency.

The connecting lines such as the transmission and feeder lines 20, 24, 28 may each include a protection system 30 to protect individual components from damage during or following extreme conditions. For example, it is envisaged that at least an appropriate circuit breaker will be included in each line.

Hereinafter, it should be assumed that references to components being connected or connections between components comprise suitable feeder or transmission lines as described above unless it is otherwise indicated.

A Power Plant Controller (PPC) 32 is connected to the power network 10 at a Point of Measurement (PoM) 34 and is also connected directly to the WPP 12. The role of the PPC 32 is to act as a command and control interface between the WPP 12 and a grid operator or transmission system operator (TSO) 36. The TSO 36 is responsible for indicating the needs and requirements of the main grid 16 to the PPC 32. The PPC 32, in its role as command and control interface, interprets the power delivery demands requested of it by the TSO 36 and manages the wind turbines 14 in the WPP 12 in order to satisfy those requirements, whilst taking into account other operative factors such as grid faults and sudden changes in output or measured grid voltage.

The PPC 32 is a suitable computer system for carrying out the controls and commands as described above and so incorporates a processing module 38, a connectivity module 40, a memory module 42 and a sensing module 44.

In order to monitor and regulate the output of the WPP 12 and to interpret the power demands correctly, the PPC 32 is connected to the transmission line 28 between the main transformer 22 and the PoI 26 at the PoM 34. The PPC 32 is equipped to measure a variety of parameters including a representative power output that will be supplied to the main grid 16 at the PoI 26 by the WPP 12. As the PoM 34 is not at the PoI 26, the measured parameters are only representative as losses in the lines between the PoM 34 and PoI 26, and between the PoM 34 and the PPC 32, may have an effect on the measurements. Suitable compensation may take place to account for the losses to ensure that the measurements are accurate.

In addition, the PPC 32 measures parameters of the power output such as a frequency and voltage, as well as reactive power exchange between the WPP 12 and the main grid 16 and the voltage level of the main grid 16. The PPC 32 compares the measured parameters against specific grid requirements and communicates control commands to specific components of the WPP 12 accordingly. The WPP 12 is capable of altering its reactive power output in reaction to commands received from the PPC 32.

To ensure a greater level of control over reactive power exchange, a reactive power compensator 46 such as a Static Synchronous Compensator (STATCOM) or Static VAR Compensator (SVC) is incorporated into the WPP 12 and connects to the collector bus 18 in parallel to the plurality of wind turbines 14. The compensator 46 is configured to provide reactive power compensation when required, such as when instructions are received from the PPC 32 according to a control strategy.

The PPC 32 communicates control commands to both the compensator 46 and to the turbines 14 in a suitable manner. It will be noted that FIG. 1 is a schematic view, so the way in which the control commands are transferred to the compensator 46 and/or the turbines 14 is not depicted explicitly. However, it will be appreciated that suitable cabling may be provided to interconnect the PPC 32 and the compensator 46 and/or turbines 14. The interconnections may be direct or 'point to point' connections, or may be part of a local area network (LAN) operated under a suitable protocol (CAN-bus or Ethernet for example). Also, it should be appreciated that rather than using cabling, the control commands may be transmitted wirelessly over a suitable wireless network, for example operating under WiFi™ or ZigBee™ standards (IEEE802.11 and 802.15.4 respectively).

The diagram of FIG. 1 should be taken as a representation of a power network only. Alternative configurations of power network and power plants are known and it is expected that other known components may be incorporated in addition to or as alternatives to the components shown and described in FIG. 1. Such changes would be within the capabilities of the skilled person. For example, substations or extra transformers would be expected to be incorporated in the wind power plant depending upon the number of turbines included in the plurality of wind turbines.

In some embodiments, the PoM 34 may be positioned at a different position in the system such that the parameters measured by the PPC 32 are not representative of the actual values for those parameters at the PoI 26 and the values may differ by an order of magnitude or more. In this case, a correction factor may be applied to the measurements to adjust for the different position of the PoM 34 relative to the PoI 26. It therefore does not matter where the PoM 34 with regard to the PoI 26, so long as there is a predetermined correction factor. Therefore, the measured voltage may be indicative of, or associated with, the voltage at the point of interconnection, even if the voltage is not measured directly at that location.

To be able to supply power to the main grid 16, the WPP 12 must comply with a set of grid requirements specific to the main grid 16. As described above, the PPC 32 communicates control commands to alter the power output and real and reactive power exchange at the PoI 26. One functional aspect of the PPC 32 is to control reactive power limits to reduce the likelihood of disconnection from the grid 16, and thereby to maintain grid stability. Grid requirements outline reactive power exchange limits with respect to real power output and to voltage variations.

Figure 2:
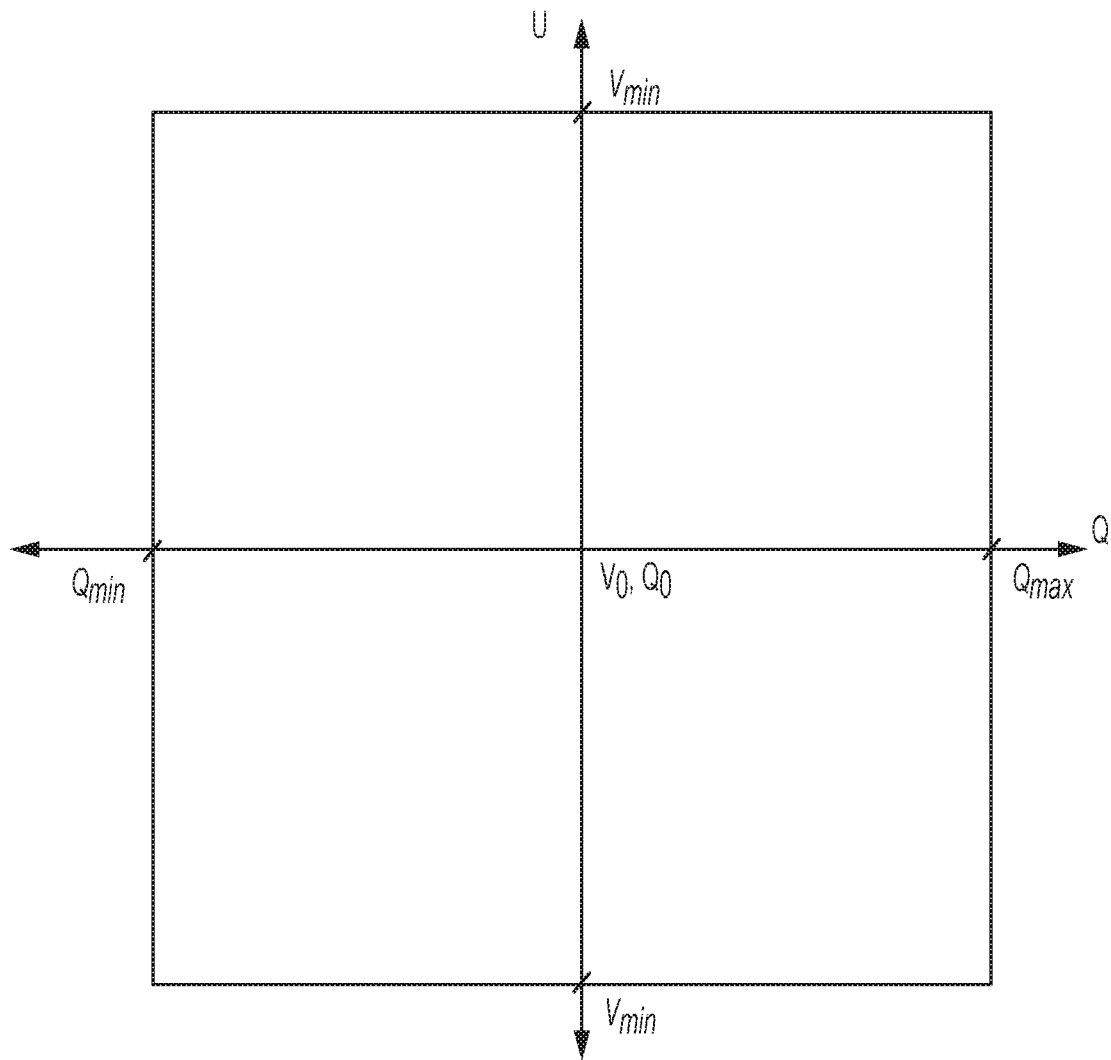
FIG. 2 is a chart outlining the relationship between voltage and reactive power exchange limits in one approach used in known systems.

One known approach to reactive power exchange at the PoI 26 is shown in FIG. 2.

FIG. 2 shows the allowable reactive power exchange (Q) with respect to measured grid voltage (U) in the known approach.

Reactive power levels, Q, are shown on the X axis of FIG. 2, while voltage levels, U, are shown on the Y axis of FIG. 2. Reactive power exists in an AC circuit when the current and voltage are not in phase. When the current in a system lags the voltage of that system, the system injects reactive power. In contrast, when the current leads the voltage in the system, the system absorbs reactive power.

When considering the WPP 12 and the chart of FIG. 2, the reactive power boundary value labelled $Q_{max}$ corresponds to a lagging current, and $Q_{max}$ therefore corresponds to the WPP 12 supplying a maximum reactive power to the main grid 16. In contrast, $Q_{min}$ corresponds to a leading current, and therefore to a maximum reactive power absorption level of the WPP. The point $Q_0$ at the origin corresponds to the WPP having a voltage and current that are in phase, and therefore to an equilibrium state where an equal amount of reactive power is being supplied as is being absorbed. The boundary values are specified by the grid code in relation to the operational limits of the WPP.

The voltage boundary values $V_{max}$ and $V_{min}$ correspond to respective maximum and minimum reactive power levels at which the WPP may operate, and in this case correspond to 1.1 per-unit voltage (pu) and 0.9 pu respectively. The origin, $V_0$ corresponds to the base voltage 1.0 pu which is the nominal grid voltage. As would be understood by the skilled person, per-unit voltage is an expression of the voltage with respect to a base value which is used as a reference. Using a per-unit system allows for normalization of values across transformers and other components that may change the value by an order of magnitude.

As can be seen, at all voltages between $V_{max}$ and $V_{min}$, a range of reactive power levels can be demanded by the PPC, and the envelope extends to the boundary values $Q_{max}$ and $Q_{min}$. It should be noted that in this implementation $Q_{max}$ and $Q_{min}$ are in effect static values which remain constant irrespective of the grid voltage level. Similarly, at all reactive power levels, the system can continue operation at up to the voltage boundaries $V_{max}$ and $V_{min}$.

In effect, in this known approach, as there is minimal consideration given to limiting reactive power exchange, it is possible that the PPC 32 could command a relatively high reactive power to be injected into the main grid 16 when the grid voltage is relatively high and conversely, the PPC 32 could command relatively high absorption from the grid 16 by the WPP 12 when the voltage of the grid 16 is relatively low. This could result in instability of the grid 16.

For example, in circumstances where the grid voltage level is 1.1 pu, the PPC 32 is able to command high reactive power delivery from the WPP 12. Since reactive power directly influences voltage levels there is a risk that excessive reactive power injection of relatively high grid voltage could cause inadvertent instability in the grid 16.

In another example, the circumstance when the WPP 12 is being operated by the PPC 32 in a reactive power control (Qcontrol) mode is considered, where reactive power is controlled and TSO 36 requirements met. In the approach of FIG. 2, the WPP 12 is allowed to supply maximum reactive power to the grid 16 even in the event of a sudden rise in the grid voltage from a level to $V_{max}$. In this circumstance, there is a risk that a high voltage may be caused across the terminals of the wind turbine generators 14 which could lead to disconnection or damage of the WPP 12.

The invention provides an approach by which a PPC 32 may manage the reactive power delivery or absorption demands of an associated power plant more effectively, in particular to avoid scenarios where large amounts of reactive power are delivered during relatively high grid voltage conditions and, conversely, where large amounts of reactive power are absorbed during relatively low grid voltage conditions. An approach for the avoidance of said scenarios is illustrated in FIG. 3, which illustrates the relationship between voltage and reactive power limits as implemented by a PPC 32 at the PoI 26.

Figure 3:
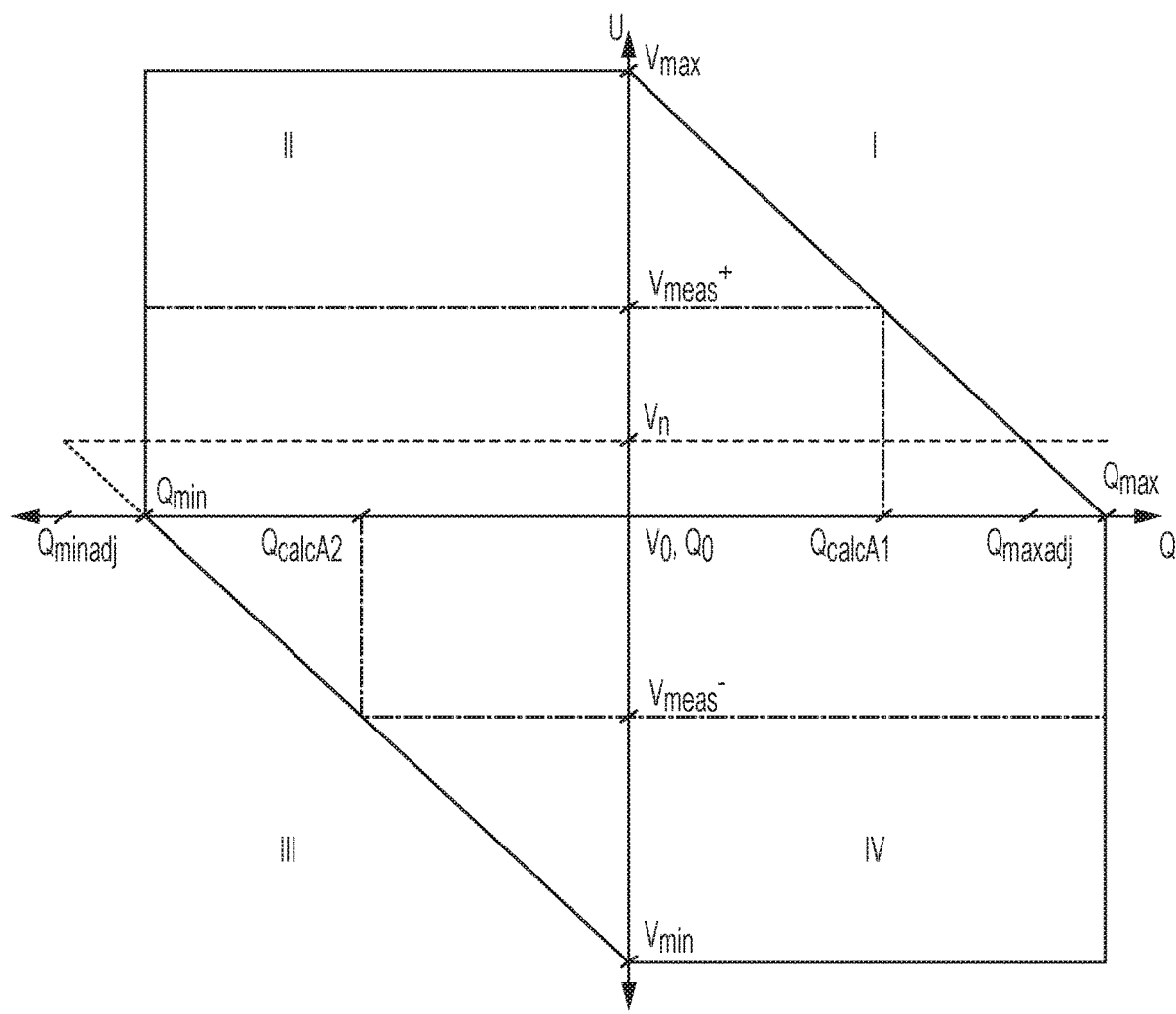
FIG. 3 is a chart outlining reactive power limits as implemented by a power plant controller according to an embodiment of the present invention.

In FIG. 3, which illustrates reactive power exchange limits with respect to voltage according to the invention, $Q_{max}$ and $Q_{min}$ are the respective maximum and minimum reactive power boundary levels specified by the grid code, while $V_{max}$ and $V_{min}$ are the maximum and minimum voltage levels corresponding, in this case, to 1.1 pu and 0.9 pu respectively.

$V_n$ is the natural voltage of the WPP, which is expected to be slightly above 1.0 pu. Natural voltage of the WPP is to be understood as the voltage level which the WPP will have during normal operation, neglecting any minor variations. $V_{meas}^+$ and $V_{meas}^-$ are voltages measured by the PPC 32 close to the PoI 26. $V_0$ is the reference voltage or nominal grid voltage, corresponding to the voltage power value at the origin of the chart in FIG. 3. $V_0$ corresponds to 1.0 pu which is the nominal grid voltage. $V_0$ is designated by the TSO at a predetermined transmission/distribution level. This voltage level is the rated voltage to which transformers step-up the voltage for supply to the grid to reduce power loss in transmission lines. In contrast, $V_n$ occurs as the grid is affected by local phenomena.

$Q_{maxadj}$ and $Q_{minadj}$ are adjusted reactive power values used for calculation only and are based upon $V_n$ according to the following equations:

$$Q_{maxadj} = \left[\frac{V_{max} - V_n}{V_{max} - V_0}\right] * Q_{max} \quad [1]$$

$$Q_{minadj} = \left[\frac{V_n - V_{min}}{V_0 - V_{min}}\right] * Q_{min} \quad [2]$$

Therefore, when $V_n$ is equal to $V_0$ (1.0 pu), then $Q_{maxadj}=Q_{max}$ and $Q_{minadj}=Q_{min}$. In alternative embodiments, $Q_{maxadj}$ and $Q_{minadj}$ are taken directly from the grid code requirements. It should be noted that reactive power never exceeds $Q_{max}$ and $Q_{min}$, and that $Q_{maxadj}$ and $Q_{minadj}$ are values used for calculation only.

Considering the scenario when $V_{meas}^+$ is measured by the PPC 32 during operation of the WPP 12, the reactive power limits are set according to the chart of FIG. 3. A lower limit is set as $Q_{min}$ and an upper limit is set as $Q_{calcA1}$. $Q_{calcA1}$ is calculated according to the limit shown in FIG. 3 and corresponds to the following equation:

$$Q_{calcA1} = \left[\frac{V_{max} - V_{meas}^+}{V_{max} - V_n}\right] * Q_{maxadj} \quad [3]$$

Similarly, considering the scenario when $V_{meas}^-$ is measured by the PPC 32 during operation of the WPP 12, the reactive power limits are set according to the chart of FIG. 3. An upper limit is set as $Q_{max}$ and a lower limit is set as $Q_{calcA2}$. $Q_{calcA2}$ is calculated according to the outlined limit line in FIG. 3, which corresponds to the following equation:

$$Q_{calcA2} = \left[\frac{V_{meas}^- - V_{min}}{V_n - V_{min}}\right] * Q_{minadj} \quad [4]$$

During operation of the system according to the limits of FIG. 3, voltage samples are taken at a suitable rate and the relevant Q limits are calculated for the measured voltage.

While $V_{meas}^+$ and $V_{meas}^-$ are identified as specific values above, $V_{meas}^+$ is intended to indicate a measured voltage that is greater than $V_0$, while $V_{meas}^-$ is intended to indicate a measured voltage that is less than $V_0$. In practice only a single voltage level will be measured at a time. Similarly, $Q_{calcA1}$ and $Q_{calcA2}$ are intended to indicate the reactive power exchange limits corresponding to the $V_{meas}^+$ and $V_{meas}^-$ respectively.

It is envisaged that the calculations may be performed in real time and at a suitable rate, for example 0.1 Hz. This gives a reasonable balance between calculating the limits at a rate that ensures the limits are responsive and accurate given grid voltage changes, whilst not requiring excessive processor loading.

By constantly recalculating the applicable reactive power limits, the grid code requirements can be complied with, and complete control over reactive power output achieved. Even if the reactive power level specified for operation is outside of the limits, the voltage can be adjusted to compensate for the necessary change in reactive power level, thereby maintaining a safe system.

Application of the reactive power limits according to FIG. 3 by the PPC guarantees strict adherence to grid code requirements. As the shape of the chart in FIG. 3 is dependent upon the nominal voltage level, $V_0$ can here be thought of a characteristic voltage level responsible for characterising the limits implemented by the system.

Figure 4:
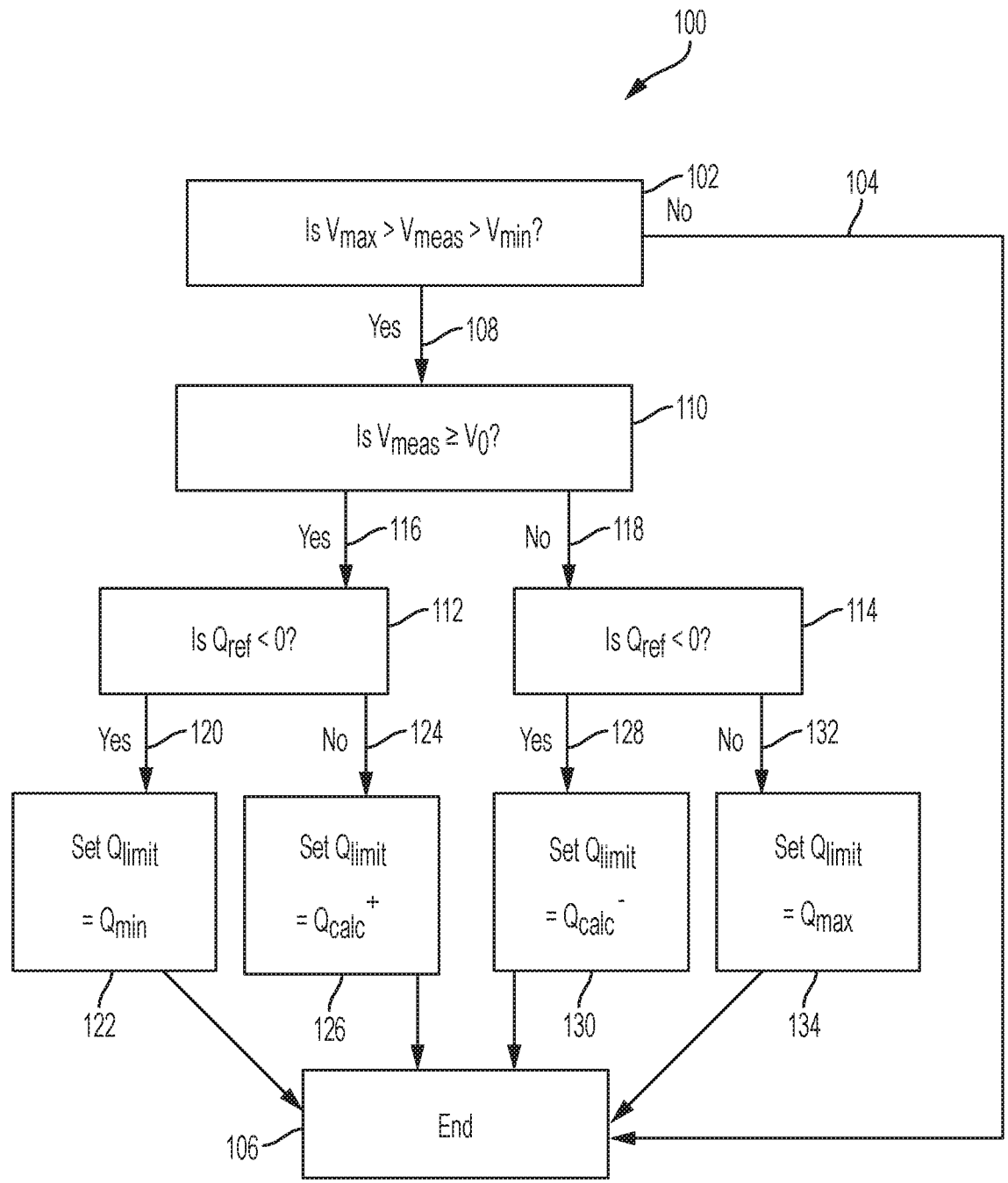
FIG. 4 is a flow chart illustrating a process governing the setting of reactive power limits for a wind power plant of the type shown in FIG. 1 by a power plant controller.

FIG. 4 illustrates a flow chart of a process 100 that may be implemented by the PPC 32. The process 100 governs the calculation of the limits within the system 10. In the process 100 of FIG. 4, the system 10 initially performs a safety check 102, to ensure that the measured voltage, $V_{meas}$, falls between the voltage boundary values $V_{max}$ and $V_{min}$. If it is found that $V_{meas}$ does not fall between the required boundary values 104, the process ends 106 immediately and other operations such as shut down routines are performed to ensure the safety of the WPP 12 and the system 10 as a whole. These other operations do not fall within the scope of the invention and so will not be discussed further.

If $V_{meas}$ is between the boundary values 108, the process 100 progresses to the second step 110, where $V_{meas}$ is compared to the origin voltage $V_0$.

At the steps 112, 114 that follow the comparison of $V_{meas}$ to $V_0$, the $Q_{ref}$ value is compared to 0 limit. $Q_{ref}$ is the reactive power reference value and is derived from instructions received by the PPC 32 from the TSO 36. In some embodiments, the $Q_{ref}$ comparison step 112, 114 and the previous step 110 in the process 100 may occur simultaneously or may be in the opposite order.

Put another way, the process 100 of FIG. 4 seeks to identify the quadrant of the U-Q chart of FIG. 3 in which the measured voltage and reactive power reference value lie, and therefore which reactive power limit should be used. The process first identifies 110 the voltage level of the main grid using the nominal voltage as a threshold value, and secondly identifies 112, 114 whether the reference reactive power value corresponds to absorption of reactive power from the grid 16 or to supply of reactive power to the main grid 16, again by comparison to a threshold which in this case is 0.

For a high measured grid voltage 116, e.g. between 1.0 pu and 1.1 pu in FIG. 3, and for a reference reactive power value that corresponds to supply 124 of reactive power to the main grid 16 by the WPP 12, the reactive power limit is set 126 according to equation [3] as $Q_{calc}^+$, and can be seen in the first quadrant of the chart of FIG. 3.

The quadrants will be labelled according to the conventional Cartesian coordinate system: the top right quadrant being the first quadrant (I) and the top left quadrant being the second quadrant (II), while the third and fourth quadrants (III, IV) correspond to the lower left and right quadrants respectively.

For a high measured grid voltage 116, e.g. between 1.0 pu and 1.1 pu in FIG. 3, and for a reference reactive power value that corresponds to absorption 120 of reactive power by the WPP 12 from the grid 16, the reactive power limit is set 122, by the process in FIG. 4, to $Q_{min}$, which is the maximum absorption possible, and is the limit specified for the second quadrant of the U-Q chart.

For low measured grid voltage 118, e.g. between 0.9 pu and 1.0 pu in FIG. 3, and for a reference reactive power value that corresponds to absorption 128 of reactive power by the WPP 12 from the grid 16, the reactive power limit is set 130 according to equation [4], as shown in the third quadrant of FIG. 3.

Finally, for low measured grid voltage 118, e.g. between 0.9 pu and 1.0 pu in FIG. 3, and for a reference reactive power value that corresponds to supply 132 of reactive power to the main grid 16 by the WPP 12, the reactive power limit is set 134 to $Q_{max}$, which is the maximum possible supply of reactive power, and is the limit specified for the fourth quadrant of the U-Q chart.

Expressed in different terms, in the case that $V_{meas} > V_0$ (116) and $Q_{ref} < 0$ (120), $Q_{limit}$ is set (122) as $Q_{min}$. In the case that $V_{meas} > V_0$ (116) and $Q_{ref} > 0$ (124), $Q_{limit}$ is set (126) as $Q_{calc}^+$ which corresponds to $Q_{calcA1}$ in FIG. 3.

In the case that $V_{meas} < V_0$ (118) and $Q_{ref} < 0$ (128), $Q_{limit}$ is set (130) as $Q_{calc}^-$ which corresponds to $Q_{calcA2}$ in FIG. 3. In the case that $V_{meas} < V_0$ (118) and $Q_{ref} > 0$ (132), $Q_{limit}$ is set (134) as $Q_{max}$.

$Q_{calc}^+$ is the upper reactive power limit taken from the limit line in the first quadrant of the chart of FIG. 3, while $Q_{calc}^-$ is the lower reactive power limit taken in the third quadrant of the chart of FIG. 3. It is assumed that the quadrants are numbered clockwise.

So, it can be seen that where the measured grid voltage is greater than 1.0 pu, the reactive power limit $Q_{calc}^+$ defines a sloping line between $V_{max}$ and $Q_{max}$. This means that at high values of measured grid voltage, e.g. 1.1 pu, the reactive power supply is restricted to very low levels, and, in extreme cases, to zero.

Similarly, it can be seen that where the measured grid voltage is less than 1.0 pu, the reactive power limit $Q_{calc}^-$ defines a sloping line between $V_{min}$ and $Q_{min}$. This means that at low values of measured grid voltage, e.g. 0.9 pu, the reactive power absorption is restricted to very low levels, and, in extreme cases, to zero.

Having set the $Q_{limit}$ value, the process 100 ends 106. As described above the process 100 calculates the reactive power limit continuously at regular intervals to ensure that the grid code requirements are conformed with.

When the limits have been calculated according to FIG. 4, the PPC 32 acts to implement the limits by commanding changes in operation of the wind turbines 14 and compensation equipment 46.

Figure 5:
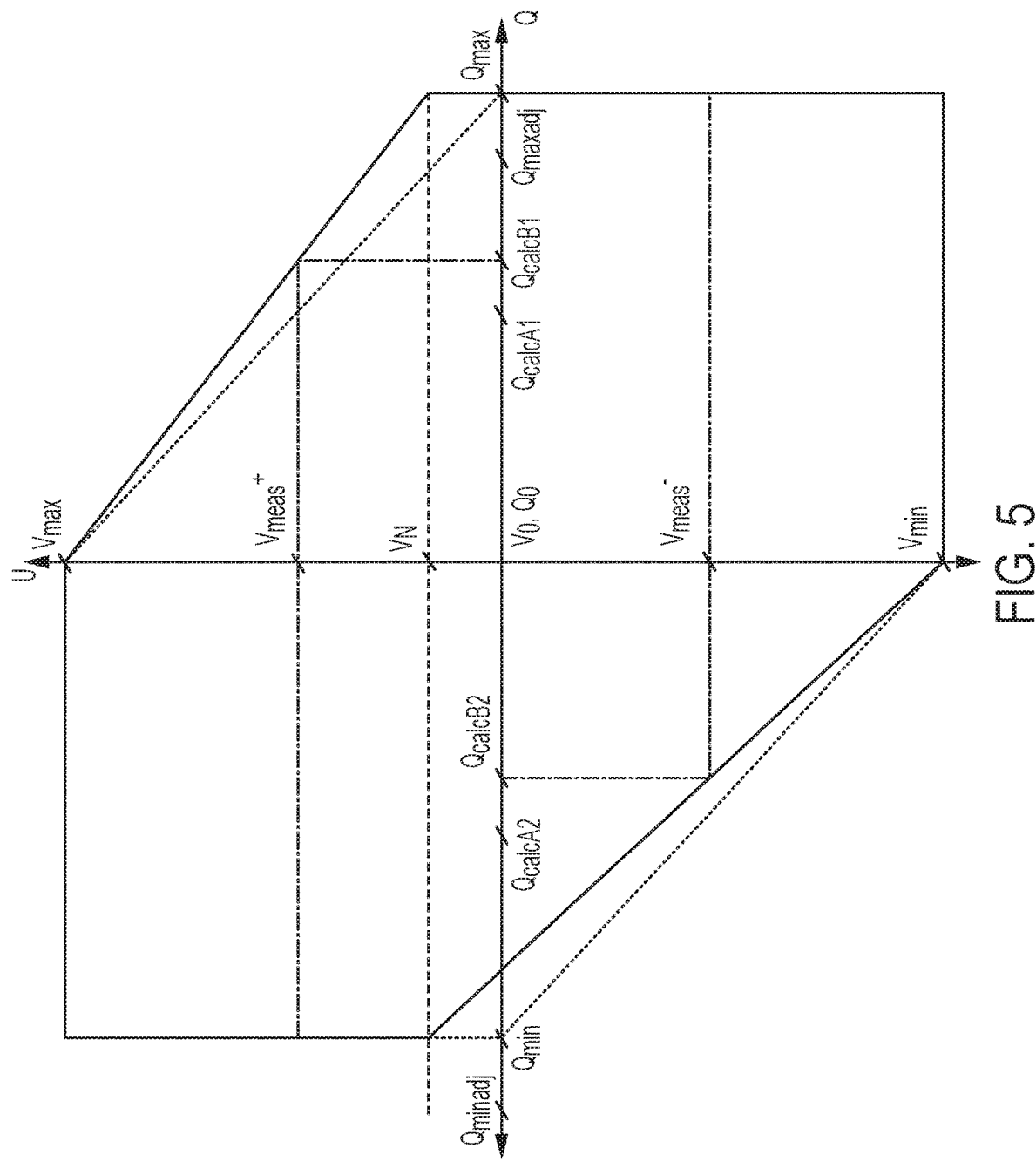
FIG. 5 is a chart outlining reactive power limits as implemented by a power plant controller according to another embodiment of the present invention.

An alternative embodiment of the invention is shown in FIG. 5. The chart of FIG. 5 is similar to that shown in FIG. 3, with adjusted limits that are based upon the natural voltage of the WPP 12.

In situations where the voltage level at the PoI 26 is known to be higher than the nominal voltage $V_n$, i.e. when $V_{meas}^+$ is measured, the TSO 36 can choose to have a modified reactive power limit level of FIG. 5, rather than the strict adherence to the grid code reactive power requirements shown in FIG. 3, providing the PPC 32 is capable of applying the limits. In some embodiments, the PPC 32 may be restricted to strictly applying the limits of FIG. 3 only. The limit levels of FIG. 5 will now be explained in more detail.

In FIG. 5, the limits as previously determined by the chart of FIG. 3 are illustrated by the dotted lines. $Q_{calcA1}$ and $Q_{calcA2}$ are also depicted to provide a comparison against the limits set in FIG. 3. $Q_{maxadj}$ and $Q_{minadj}$ are based upon $V_n$ and so as $V_n$ has remained at the same value in FIG. 5 as it was in FIG. 3, then no change will be seen in $Q_{maxadj}$ and $Q_{minadj}$. Similarly, $V_{meas}^+$ and $V_{meas}^-$ have been retained at the same position as was shown in FIG. 3, to provide a comparable chart.

Focussing now on FIG. 5, for voltage levels between $V_n$ and $V_{max}$, the upper reactive power limit, $Q_{calcB1}$ for example (i.e. between Q=0 and $Q=Q_{max}$), is calculated according to the following equation:

$$Q_{calcB1} = \left[\frac{V_{max} - V_{meas}^+}{V_{max} - V_n}\right] * Q_{max} \qquad [5]$$

For voltage levels between $V_n$ and $V_{max}$ the lower reactive power limit is $Q_{min}$.

For voltage levels between $V_{min}$ and $V_n$ the upper reactive power limit is $Q_{max}$.

For voltage levels between $V_{min}$ and $V_n$ the lower reactive power limit, $Q_{calcB2}$ for example (i.e. between $Q=Q_{min}$ and Q=0), is calculated according to the following equation:

$$Q_{calcB2} = \left[\frac{V_{meas}^- - V_{min}}{V_n - V_{min}}\right] * Q_{min} \qquad [6]$$

In FIG. 5, therefore, the calculated Q limits are dependent upon the natural voltage of the system. In both FIG. 5 and FIG. 3, the calculated Q limits are the same when $V_n = V_0$.

When operating according to the limit calculations of FIG. 5, the system runs a similar process to that found in FIG. 4. The difference in the new process lies in that at the second step, $V_{meas}$ is compared to $V_n$ rather than $V_0$. When implementing the limits according to FIG. 5, $V_n$ can be thought of as the characteristic voltage level.

Although the system is depicted here as applying to a wind power plant, it is possible to apply the system to any other form of renewable energy power plant such as a photovoltaic power plant.

Many modifications may be made to the above examples without departing from the scope of the present invention as defined in the accompanying claims.

The invention claimed is:

1. A method for controlling a renewable energy power plant comprising a plurality of wind turbine generators, the method comprising:
   measuring a voltage level associated with a point of interconnection between a power transmission network and the power plant;
   calculating a reactive power exchange limit based upon the measured voltage level; and
   controlling the power plant so that the calculated reactive power exchange limit is not exceeded.

2. The method as claimed in claim 1, wherein calculating the reactive power exchange limit comprises:

determining a characteristic voltage level associated with the power transmission network; and determining whether the measured voltage level is above or below the characteristic voltage level.

3. The method as claimed in claim 2, wherein the characteristic voltage level is a nominal voltage level of the power transmission network.

4. The method as claimed in claim 2, wherein the characteristic voltage level is a natural voltage level of the power transmission network.

5. The method as claimed in claim 2, further comprising:

receiving a reactive power reference value from a transmission system operator associated with the power transmission network, wherein calculating the reactive power exchange limit comprises determining whether the reactive power reference value corresponds to a reactive power supply or reactive power absorption demand.

6. The method as claimed in claim 5, wherein the reactive power reference value corresponds to a reactive power absorption demand and the measured voltage level is above the characteristic voltage level, and wherein the reactive power exchange limit is calculated as a maximum reactive power absorption level.

7. The method as claimed in claim 5, wherein the reactive power reference value corresponds to a reactive power absorption demand and the measured voltage level is below the characteristic voltage level, and wherein the reactive power exchange limit is calculated as a reactive power absorption level that is negatively proportional to the measured voltage level.

8. The method as claimed in claim 5, wherein the reactive power reference value corresponds to a reactive power supply demand and the measured voltage level is below the characteristic voltage level, and wherein the reactive power exchange limit is calculated as the maximum reactive power supply level.

9. The method as claimed in claim 5, wherein the reactive power reference value corresponds to a reactive power supply demand and the measured voltage level is above the characteristic voltage level, and wherein the reactive power exchange limit is calculated as a reactive power absorption level that is negatively proportional to the measured voltage level.

10. The method as claimed in claim 5, wherein the power plant further comprises reactive power compensation equipment, the method further comprising:

altering the operation of the power plant to meet the reactive power reference value demand when the reactive power reference value does not exceed the reactive power exchange limit; and altering the operation of the power plant to supply or absorb the reactive power exchange limit when the reactive power reference value exceeds the reactive power exchange limit.

11. A power plant controller for a power plant having a plurality of wind turbine generators and reactive power compensation equipment, wherein the controller comprises:

a processor;
an input/output system; and a memory that includes a set of program code instructions which when executed by the processor, implement an operation comprising:

measuring a voltage level associated with a point of interconnection between a power transmission network and the power plant;

calculating a reactive power exchange limit based upon the measured voltage level; and controlling the reactive power compensation equipment so that the calculated reactive power exchange limit is not exceeded.

12. The power plant controller of claim 11, wherein calculating the reactive power exchange limit comprises:

determining a characteristic voltage level associated with the power transmission network; and determining whether the measured voltage level is above or below the characteristic voltage level.

13. The power plant controller of claim 12, wherein the characteristic voltage level is a nominal voltage level of the power transmission network.

14. The power plant controller of claim 12, wherein the characteristic voltage level is a natural voltage level of the power transmission network.

15. The power plant controller of claim 12, wherein the operation further comprises:

receiving a reactive power reference value from a transmission system operator associated with the power transmission network, wherein calculating the reactive power exchange limit comprises determining whether the reactive power reference value corresponds to a reactive power supply or reactive power absorption demand.

16. The power plant controller of claim 15, wherein when the reactive power reference value corresponds to a reactive power absorption demand and the measured voltage level is above the characteristic voltage level, the reactive power exchange limit is calculated as a maximum reactive power absorption level.

17. The power plant controller of claim 15, wherein when the reactive power reference value corresponds to a reactive power absorption demand and the measured voltage level is below the characteristic voltage level, the reactive power exchange limit is calculated as a reactive power absorption level that is negatively proportional to the measured voltage level.

18. The power plant controller of claim 15, wherein when the reactive power reference value corresponds to a reactive power supply demand and the measured voltage level is below the characteristic voltage level, the reactive power exchange limit is calculated as the maximum reactive power supply level.

19. A computer program product stored on a machine readable medium, the computer program product comprising program code instructions which, when executed by one or more processors, perform an operation for controlling a renewable energy power plant comprising a plurality of wind turbine generators, the operation comprising:

measuring a voltage level associated with a point of interconnection between a power transmission network and the power plant;

calculating a reactive power exchange limit based upon the measured voltage level; and controlling the power plant so that the calculated reactive power exchange limit is not exceeded.

* * * * *